United States Patent

[11] 3,603,481

| [72] | Inventors | Lawrence Dilger<br>South Croydon;<br>Ernest S. Ashford, Felbridge East Grinstead, both of, England |
|---|---|---|
| [21] | Appl. No. | 861,710 |
| [22] | Filed | Sept. 29, 1969 |
| [45] | Patented | Sept. 7, 1971 |
| [73] | Assignee | Veeder Industries, Inc.<br>Hartford, Conn. |
| [32] | Priority | Oct. 2, 1968 |
| [33] | | Great Britain |
| [31] | | 46,717/68 |

[54] FLUID-DISPENSING APPARATUS CONTROL SYSTEM
16 Claims, 3 Drawing Figs.

[52] U.S. Cl. ............................................. 222/23,
222/30, 222/33
[51] Int. Cl. ............................................. B67d 5/06
[50] Field of Search ..................................... 222/14, 16,
23, 33, 30, 32, 70, 35; 194/.02

[56] References Cited
UNITED STATES PATENTS

| 2,533,319 | 12/1950 | Hazard | 222/23 X |
|---|---|---|---|
| 3,044,662 | 7/1962 | Wright et al. | 222/35 X |
| 3,187,945 | 6/1965 | Wright et al. | 222/35 |
| 3,188,005 | 6/1965 | Wright et al. | 222/35 X |
| 3,508,681 | 4/1970 | Fitzgerald | 222/30 |

*Primary Examiner*—M. Henson Wood, Jr.
*Assistant Examiner*—Thomas C. Culp, Jr.
*Attorney*—Prutzman, Hayes, Kalb & Chilton

ABSTRACT: A gasoline pump having a control system with a constant speed electric drive motor connected to be energized when the pump is operated to deliver fuel and to remain energized until after the delivery of fuel is completed. One-turn mechanisms comprising drive ratchet wheels driven by the motor and driven ratchet pawls are adapted to be selectively engaged for resetting the pump register when the pump is operated to deliver fuel and for operating a printer after the completion of the fuel delivery to record the amount of the delivery. A timing counter driven by the constant-speed drive motor automatically terminates the delivery after a predetermined interval.

INVENTORS
LAWRENCE DILGER
ERNEST S. ASHFORD
BY Prutzman, Hayes, Kalb and Chilton
ATTORNEYS

FLUID-DISPENSING APPARATUS CONTROL SYSTEM

BRIEF SUMMARY OF THE INVENTION the present invention relates generally to fluid-dispensing or fluid delivery apparatus of the type conventionally employed for delivering liquid fuel, for example gasoline, and is particularly concerned with a control system for operating the various mechanisms of the fluid-dispensing apparatus.

In known fluid-dispensing apparatus control systems an electric motor is connected to be energized for resetting the register conventionally employed in such apparatus just prior to the commencement of each fluid delivery, to be automatically deenergized after the register is reset and to remain deenergized during the following delivery of fluid.

In accordance with the present invention an improved control system is provided in which the electric motor is connected for performing two or more separate functions—which may include resetting the register—at such time in the operating cycle of the dispensing apparatus—before, during or after the fluid delivery—as is desirable. In one form of the present invention the electric motor is connected for operating the register reset mechanism to reset the register just prior to the commencement of the fluid delivery and for operating a printer after the completion of the fluid delivery to print and thereby record the cost and/or volumetric amount of the fluid delivered.

The control system of the present invention may be employed in a similar manner in other types of fluid-dispensing apparatus, for example in coin-operated fluid -dispensing apparatus of the type disclosed in copending U.S. Pat. application Ser. No. 626,565 of Lawrence Dilger and Ernest Stanley Ashford, filed Mar. 28, 1967 and entitled "Fuel Dispensing Apparatus Control System," to provide for connecting the electric motor to power the additional equipment employed in such apparatus. More specifically, the control system may be employed in such fluid-dispensing apparatus to provide for connecting the electric motor for setting a preset mechanism prior to the commencement of a fluid delivery and for operating a coin refund mechanism at the termination of the fluid delivery to provide a refund for the difference between the value of the coins deposited and the cost of the fluid delivery.

According to the present invention a control system is provided in which the electric motor is connected to remain energized during the fluid delivery, and is adapted to be selectively engaged for selectively operating the various motor-driven mechanisms of the apparatus. In one embodiment employing a plurality of clutches a first of the clutches is adapted to be engaged prior to the commencement of the fluid delivery, as upon the removal of the usual hosecock from its storage receptacle, to reset the register and then condition the apparatus for delivering fuel by opening the fluid valve and/or energizing the fluid pump motor, and a second of the clutches is adapted to be engaged after the completion of the fluid delivery, as upon the return of the hosecock to its storage receptacle, for operating a printer to print the cost and/or volumetric amount of the delivery, reset the printer and deenergize the electric motor.

Preferably the control system provides for energizing the electric motor just prior to the commencement of each fluid delivery and for deenergizing the electric motor after the completion of the fluid delivery such that the electric motor remains energized during the entire fluid delivery to provide an energized power source to which the various mechanisms of the fluid-dispensing apparatus may be engaged as required for each particular installation and type of equipment.

Preferably the control system comprises a plurality of individual clutches for selectively engaging the various mechanisms of the fluid-dispensing apparatus for operation by the electric drive motor and such that the clutches may be individually and selectively engaged to operate the respective mechanisms as required.

Preferably the clutches are adapted to be selectively engaged and for automatic disengagement so that the corresponding mechanisms may be operated by the electric drive motor by selectively engaging each corresponding clutch.

Preferably the clutches employ one-turn mechanisms which comprise a driving ratchet wheel driven by the electric motor and a driven ratchet pawl which may be selectively released into engagement with the ratchet wheel to be driven one revolution whereupon the ratchet pawl is automatically withdrawn from the ratchet wheel to disengage the drive.

Preferably the control system is adapted to be operated with a control lever such that the control lever may be pivoted to an "on" angular position to energize the electric drive motor and to be operated to an "off" position to terminate the fluid delivery.

Preferably the control system employs a single switch for energizing and deenergizing the electric motor and a switch operator adapted to be actuated to energize the electric motor prior to the commencement of the fluid delivery and to be actuated after the completion of the fluid delivery cycle to deenergize the electric motor.

Preferably the control system employs a timer which is adapted to be driven by the electric motor and which provides for terminating the fluid delivery after a predetermined time interval of operation of the dispensing apparatus.

Preferably the timer comprises a counting mechanism and a timing gear driven by the counting mechanism from an adjustable initial angular position to an angular position where the timing gear functions to terminate the fluid delivery.

Where the fluid delivery apparatus comprises a printer for printing the cost and/or volumetric amount of the fluid delivery, the control system preferably comprises a clutch which is adapted to be engaged when the control lever is pivoted to its "off" position at the termination of the fluid delivery for operating the printer to print a ticket with the volumetric and/or cost amount of the fluid delivered and to thereafter reset the printer for the succeeding delivery.

Other objects will be in part obvious and in part pointed out more in detail hereinafter.

A better understanding of the invention will be obtained from the following detailed description and the accompanying drawings of an illustrative application of the invention.

BRIEF DESCRIPTION OF THE PREFERRED EMBODIMENT

Figure 1:
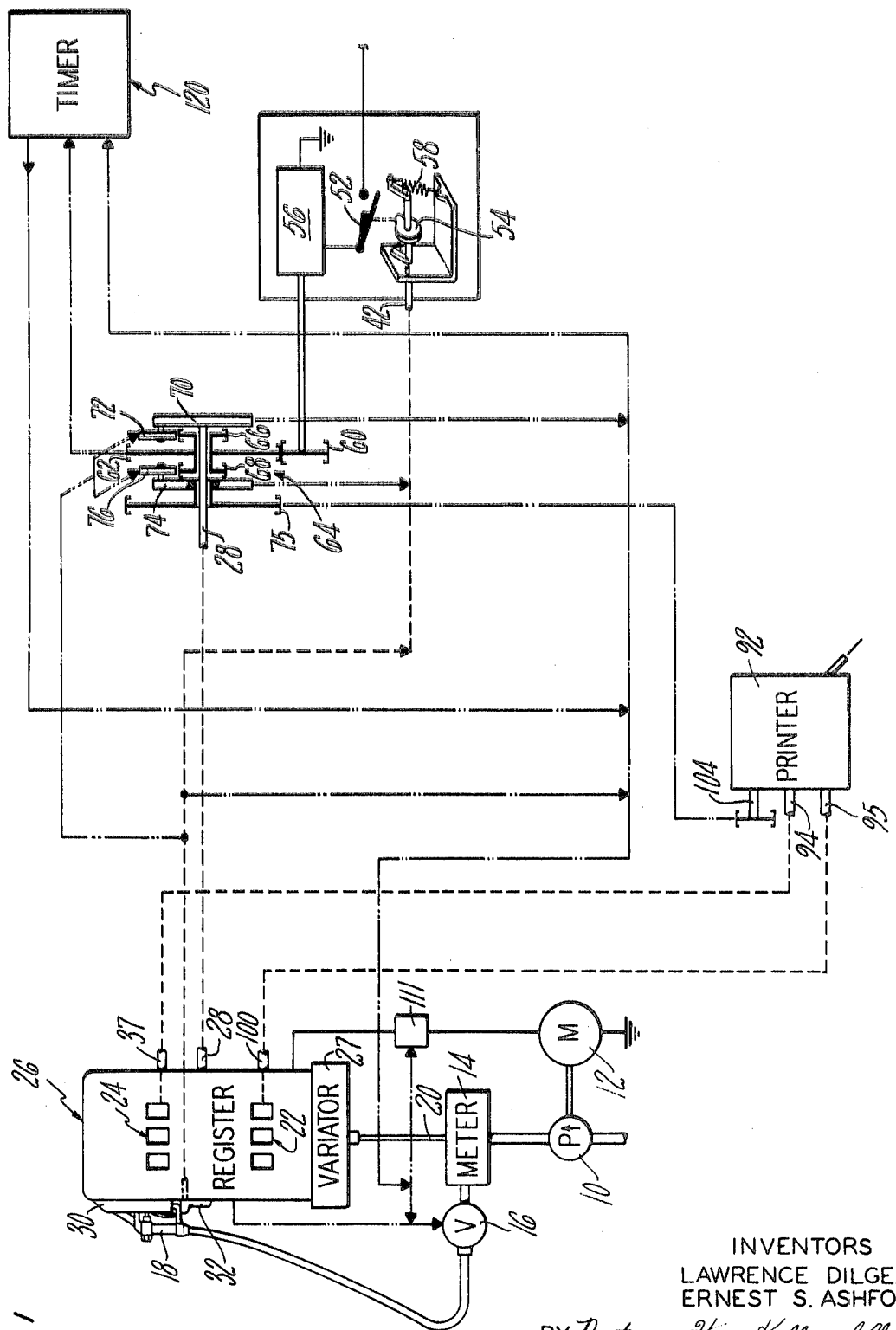
FIG. 1 is a generally diagrammatic view of the fuel-dispensing apparatus.

The fuel-dispensing apparatus shown diagrammatically in FIG. 1 incorporates in a conventional manner a fuel pump 10 that is driven by a motor 12 for supplying fuel through a meter 14 and a shutoff valve 16 to a fuel-dispensing nozzle or hosecock 18. The output shaft 20 of the meter 14 is rotated in proportion to the volume of fuel dispensed and drives the usual volume counter 22 and cost counter 24 of the register 26. A variator 27 intermediate the meter 14 and register 26 is employed in a known manner for adjustably selecting the price per unit volume of fluid dispensed. The register 26 incorporates a suitable reset mechanism which is operated conventionally between fluid deliveries, by rotation of a reset shaft 28 one complete revolution, to reset the register and thereby zeroize the cost and volume counters 22, 24.

The fuel nozzle 18 is shown provided in a conventional manner with a storage receptacle or boot 30 for storing the nozzle between fuel deliveries. A manual control lever or handle 32 is shown mounted adjacent the boot 30 such that the control handle 32 has to be manually rotated, counterclockwise as seen from the left in FIG. 1, to its "off" or vertical position to permit the nozzle to be placed in its storage receptacle and the nozzle has to be removed from its storage receptacle to permit the control handle to be pivoted in the opposite direction to its "on" position.

Figure 2:
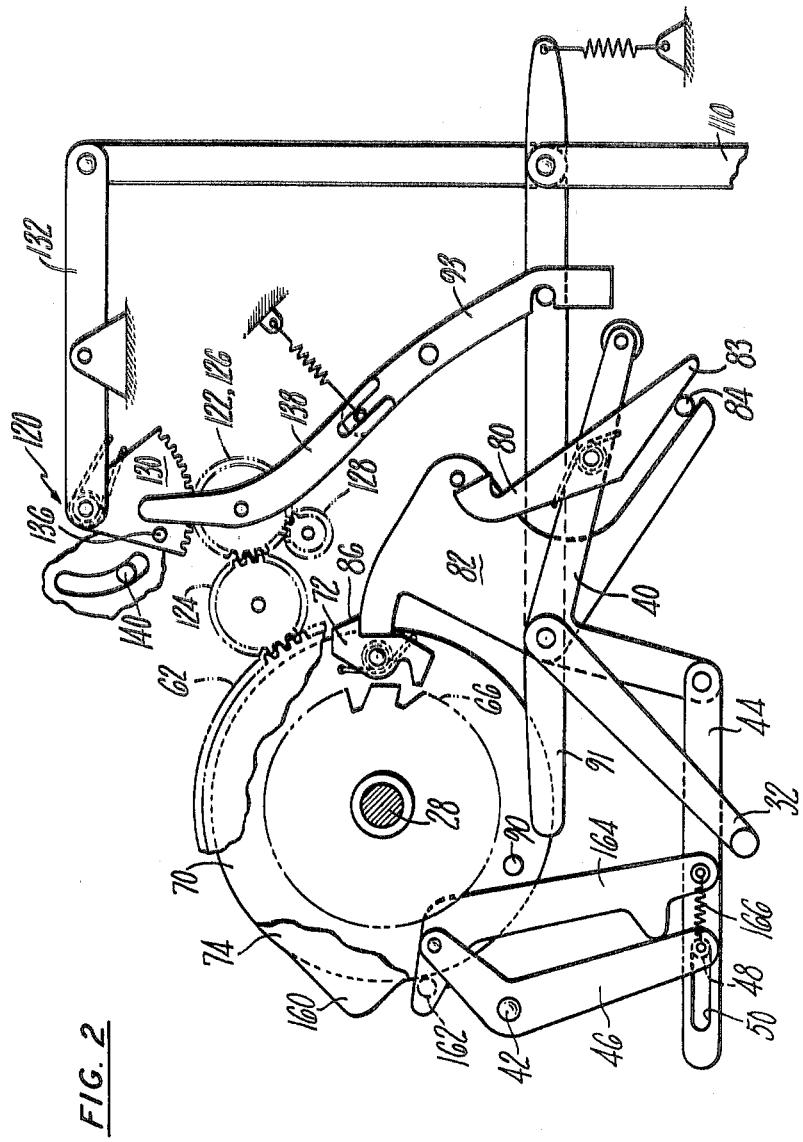
FIGS. 2 and 3 are elevation views showing portions of the control mechanism of the apparatus.

Referring to FIGS. 1 and 2, when the control handle 32 is manually pivoted to its "on" position shown in FIG. 2, a lever 40 fixed to the handle shaft is pivoted to rotate a motor control shaft 42 through a link 44 and a lever 46 fixed to the control shaft 42 and having a pin 48 received within an elongated slot 50 in the link 44 providing a lost motion connection between the link 44 and lever 46. This rotation of the control shaft 42 provides for closing a motor switch 52 with a cam 54 for energizing a constant-speed electric motor 56, the switch 52 being held closed by an overcenter spring bias provided by a tension spring 58 until the shaft 42 is rotated in the opposite angular direction, as hereinafter explained, to deenergize the motor 56.

The motor 56 when energized continually drives through a gear 60, a gear 62 of a drive member 64 having a pair of drive ratchet wheels 66,68. A first driven member 70 mounted on an end of the reset shaft 28 coaxially with the ratchet wheels 66, 68 supports a pivotal ratchet pawl 72 which is engageable with the ratchet wheel 66 for rotating the reset shaft 28 with the electric motor 56, and a second driven member 74 rotatably mounted on the reset shaft 28 supports a pivotal ratchet awl 76 which is engageable with the ratchet wheel 68 for rotating a gear 75.

The ratchet pawl 72 is controlled for engagement with the ratchet wheel 66 to rotate the reset shaft 28 one complete revolution to reset the register 26 when the handle 32 is pivoted to its "on" position. For this purpose a trip pawl 80 pivotally mounted on the lever 40 is provided for withdrawing a pivotal latch 82 against the bias of a suitable torsion spring to permit the pawl 72 to engage the ratchet wheel 66. The trip pawl 80 has an edge 83 which engages a fixed pin 84 to release the latch 82 after the ratchet pawl 72 has been released and to thereby permit the latch 82 to return under its spring bias into engagement with the outer edge 86 of the ratchet pawl 72. The timing is such that the latch 82 is released before the drive motor 56 is energized to ensure that the latch 82 reengages the pawl 72 to disengage the drive to the reset shaft 28 after the reset shaft has been rotated one revolution by the motor 56.

After the driven member 70 has been rotated approximately, but less than one revolution, a stud 90 on the driven member 70 engages the outer end of a delivery control lever 91 to pivot the lever 91, in the counterclockwise direction as viewed in FIG. 2, to its "on" position shown in FIG. 2 where it is held by a spring-biased pivotal latch 93. The delivery control lever 91 is connected by a link 110 to open the valve 16 and to actuate a switch 111 to turn on the pump motor 12 and to thereby condition the apparatus for delivering fluid.

A timer 120 is provided for automatically terminating the fluid delivery after a predetermined interval of time after the apparatus is conditioned for delivering fluid. The timer 120 employs a timing counter which comprises an input gear 122 (driven by the electric motor 56 through gears 60, 62, 124) one or more additional gears 126 coaxial with and substantially identical to the gear 122, and intermediate pinions 128 such that the angular movement of the highest order gear 126 provides a measure of the time interval of operation of the constant-speed electric motor 56. A gear sector 130 of the timer pivotally mounted on a lever 132 adapted to be pivoted into engagement with the highest order gear 126 of the counter when the delivery control lever 92 is pivoted to condition the apparatus for delivering fuel. The gear sector 130 is thereafter rotated, in the counterclockwise direction as viewed in FIG. 2, until a pin 136 thereon engages the outer end of a latch release lever 138 to pivot the latch 93, counterclockwise as viewed in FIG. 2, to release the control lever 91 and to thereby terminate the fuel delivery. Also the lever 132 is thereby pivoted to withdraw the gear sector 130 and to permit the gear sector 130 to be rotated, in the clockwise direction as viewed in FIG. 2, under the bias of a suitable torsion spring into engagement with a stop pin 140 which is mounted for adjusting the period of the timer operating cycle.

The fuel delivery is adapted to be manually terminated by pivoting the control handle 32 to its "off" position whereupon the lever 40 is pivoted, in the counterclockwise direction as seen in FIG. 2, into engagement with the latch 93 to pivot the latch outwardly against its spring bias to release the delivery control lever 91. Turning the control handle 32 to its "off" position does not, however, provide for deenergizing the electric motor 56 because of the lost motion connection provided by the slot 50.

Figure 3:
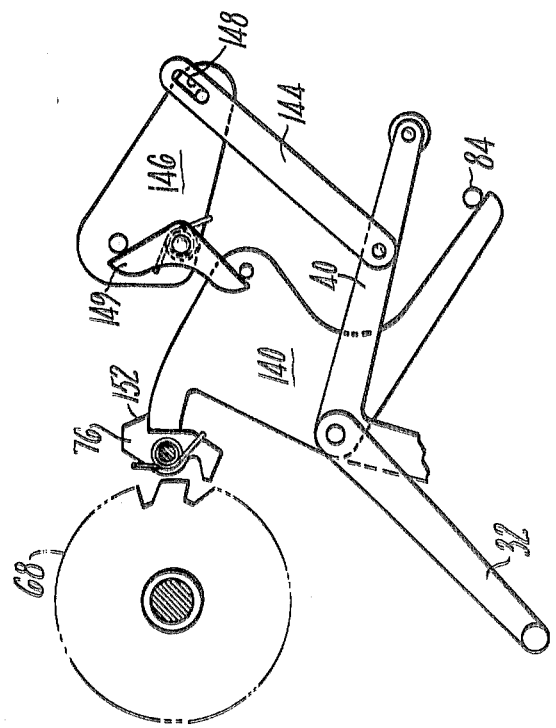

Referring to FIG. 3, the control handle, when turned to its "off" position, provides for rotating a direction control shaft 104 with the gear 75 for operating a printer 92. For this purpose a pawl latch 140 identical to the latch 82 is adapted to be withdrawn by the lever 40 when the control handle 32 is turned to its "off" position to permit the pawl 76 to engage the ratchet wheel 68. The lever 40 is connected to withdraw the pawl latch 140 by a link 144, and a trip pawl 149 pivotally mounted on the support lever 146. The trip pawl 149 is designed such that the pivotal movement of the support lever 146, in the counterclockwise direction as viewed in FIG. 3, provides for withdrawing the pawl latch 140 sufficiently to release the pawl 76 and to then release the latch 140 for engagement with the outer edge 152 of the pawl, thus ensuring the latch 140 is in position to withdraw the pawl 76 when the ratchet pawl 76 and the driven gear 75 have been rotated one revolution. Upon the subsequent pivotal operation of the control handle 32 to its "on" position, the trip pawl 149 is adapted to be pivoted against its spring bias to provide for positioning the trip pawl 149 for withdrawing the latch 140 upon the succeeding pivotal operation of the control handle 32 to its "off" position.

The operation of the printer 92 with the printer control shaft 104 is fully described in the aforementioned pending U.S. Pat. application Ser. No. 626,565. Briefly, however, the shaft is adapted to be rotated one revolution to operate the printer 92 to print a ticket with the cost and volume of the fuel delivered and to thereafter reset the cost/ and volume-printing counters of the printer. An input shaft 94 of the printer is connected to the register cost counter 24 via the shaft 37 to index the cost-printing counter in accordance with the cost amount of fuel delivered and an input shaft 95 of the printer is similarly connected to the register volume counter 22 via a shaft 100 to index the volume-printing counter in accordance with the volumetric amount of fuel delivered.

Referring to FIG. 2 the driven member 74 is adapted to deenergize the electric motor 56 after the printer control shaft 104 has been rotated to print the ticket and reset the printer. For this purpose a cam lobe 160 is provided on the driven member 74 for engagement with a follower 162 mounted on a lever 164 pivotally supported on the motor control shaft operating lever 46. This provides for pivoting the control lever, counterclockwise as viewed in FIg. 2, to deenergize the electric drive motor 56. Also because of the resilient connection provided between the levers 46, 164 by the tension spring 166, the control handle 32 may be returned to its "on" position to reenergize the electric motor 56 even if the driven member 74 has not completed a full revolution and the cam lobe 160 remains in engagement with the follower 162 when the motor is deenergized.

As will be apparent to persons skilled in the art, various modificatons, adaptations and variations of the foregoing specific disclosure can be made without departing from the teachings of the present invention.

We claim:

1. A fluid-dispensing system comprising first and second apparatus operable through operating cycles thereof during an operating cycle of the fluid-dispensing system, and electric motor with a rotary output, transmission means operable for connecting the motor output with the first and second apparatus for operating the first and second apparatus through their operating cycles respectively during an operating cycle of the fluid-dispensing system, and control means for the fluid-dispensing system operable for energizing the electric motor; the transmission means comprising clutch means engageable for separately and independently connecting the motor output with the first and second apparatus for separately and independently operating the first and second apparatus through their operating cycles respectively, and the control means being operable for selectively engaging the clutch means for separately and independently operating the first and second apparatus through their respective operating cycles and being operable for maintaining the electric motor energized to rotate the motor output continuously in one angular direction for permitting separate and independent operation of the first and second apparatus through their respective operating cycles without intermediate deenergization of the motor.

2. A fluid-dispensing system according to claim 1 wherein the control means is operable for alternatively allowing and preventing the fluid-dispensing system to deliver fluid.

3. A fluid-dispensing system according to claim 2 wherein the control means is alternatively operable for engaging the clutch means for operating the first apparatus and thereafter allow delivery of fluid; and thereafter engage the clutch means for operating the second apparatus.

4. A fluid-dispensing system according to claim 3 wherein the control means is operable to deenergize the electric motor after the second apparatus has operated through its operating cycle.

5. A fluid-dispensing system according to claim 1 wherein the control means comprises a pivotal lever manually pivotal in opposite angular directions.

6. A fluid-dispensing system according to claim 1 wherein said first apparatus is a resettable register connected for registering the amount of the fluid delivered and resettable by the motor output through the clutch means.

7. A fluid-dispensing system according to claim 1 wherein the second apparatus is a printer operable by the motor output through the clutch means to record the amount of a fluid delivery.

8. A fluid-dispensing system according to claim 1 wherein the control means is operable to engage the clutch means to operate the first apparatus through its operating cycle prior to the commencement of a fluid delivery and is operable to engage the clutch means to operate the second apparatus through its operating cycle after the termination of the fluid delivery, and is operable for energizing the electric motor continuously during the fluid delivery.

9. A fluid-dispensing system according to claim 1 wherein the control means is capable of automatically disengaging the clutch means after the first and second apparatus are operated through their operating cycles respectively.

10. A fluid-dispensing system according to claim 1 wherein the clutch means comprises first and second clutch means for connecting the motor for operating the first and second apparatus respectively.

11. A fluid-dispensing system according to claim 10 wherein the first and second clutch means each comprise a driving ratchet wheel driven by the motor output, and a driven rotary member coaxial with the ratchet wheel and having a pivotal driven pawl engageable with the ratchet wheel.

12. A fluid-dispensing system according to claim 11 wherein the control means comprises pivotal latching members operable for pivotally withdrawing the drive pawls out of engagement with the ratchet wheels respectively and for releasably latching the drive pawls in withdrawn positions out of engagement with the ratchet wheels, and manually operable means for selectively pivoting the latching members for releasing the drive pawls.

13. A fluid-dispensing system according to claim 1 further comprising a counting mechanism driven by the motor output and arranged to prevent fluid delivery after a predetermined rotary output of the motor, the control means being operable to set the counting mechanism.

14. A fluid-dispensing system according to claim 13 wherein the counting mechanism comprises a first rotary member connected to be driven by the rotary drive and a second rotary member adapted to be moved into rotatable engagement with the first rotary member by the control means, the second rotary member being operable after predetermined angular movement to prevent fluid delivery.

15. A fluid-dispensing system according to claim 14 wherein the second rotary member is pivotally mounted to be pivoted into engagement with the first rotary member.

16. In a fluid-dispensing system having an operating cycle with delivery and nondelivery phases, an electric drive motor with a rotary output, motor driven components connected for being driven by the motor output, and control means manually operable for alternatively conditioning the system to be operative and inoperative for delivering fluid and operable for energizing the electric motor during an operating cycle of the fluid-dispensing system for driving the motor-driven components, the improvement wherein the control means is operable for maintaining the motor energized to rotate the motor output continuously in one angular direction at least during the delivery phase of the operating cycle of the fluid-dispensing system and wherein the control means comprises clutch means for driving the motor-driven components with the motor output during said continuous operation of the motor.